Patented Dec. 16, 1941

2,266,159

UNITED STATES PATENT OFFICE 2,266,159

MOISTURE VAPOR PROOF PAPER LACQUER

Edmond H. Bucy, Stamford, Conn., assignor to Atlas Powder Company, Wilmington, Del., a corporation of Delaware No Drawing. Application December 15, 1938, Serial No. 245,948

18 Claims. (Cl. 260—737)

This invention relates to an improved moisture vapor proof paper lacquer, adapted to be applied in a relatively thin film to protect and decorate paper and to render it highly resistant to the transmission of moisture vapor.

The principal object of the invention is to devise a new lacquer which when applied to paper in the usual manner renders the same more highly resistant to the transmission of moisture vapor than previously known lacquers.

Another object is to devise a new process of manufacturing such a lacquer.

Still other objects will more fully hereinafter appear.

The improved paper lacquer of the present invention consists essentially of a resin-wax melt, chlorinated rubber, a plasticizer and a suitable volatile organic solvent for the several film-forming ingredients and for the plasticizer.

In accordance with the preferred practice of the present invention, substantially equal parts by weight of a suitable fusible natural resin such as shellac, mastic, rosin, sandarac, damar gum, gum elemi, copals such as manila, kauri, etc., East India gum, e. g. Macassar, Singapore, Batu, etc. but preferably gum elemi, damar gum or East India gum, and a wax such as carnauba wax, Japan wax, montan wax, ozocerite, beeswax or paraffin, but preferably the latter, are admixed with each other at room temperature and heated to an elevated temperature with stirring until the wax and resin are completely fused to a homogeneous melt. In the case of resins such as copals which must ordinarily be "run" to render them soluble in the usual varnish and lacquer solvents, it is desirable to raise the temperature of the resin-wax mixture to the range of "running" of the resin in order that the resin may rapidly dissolve in the wax. However, if a greater length of time is employed such resins will dissolve in the wax to give the desired mixture at temperatures lower than the "running" temperatures. Either of these methods of fusing such resins with the wax may be employed within the scope of the present invention. The resin-wax melt is then preferably allowed to cool to room temperature or at least until it solidifies. The cooled melt, together with halogenated rubber such as chlorinated rubber or rubber hydrochloride, and a plasticizer are now dissolved in a suitable solvent to form the finished lacquer.

Instead of fusing the wax constituent with all of the resin constituent, as described above, the wax consituent may be fused with only a part of the resin constituent. Thus the wax may be fused with less than an equal weight of resin, the balance of the resin required to make up an equal weight of resin being incorporated in the lacquer composition during its formulation. Or the wax may be fused with an equal weight of resin, and then in formulating the lacquer additional resin with which the wax has not been fused may be added.

Instead of preliminarily fusing the entire wax constituent with a part or all of the resin employed, less than all of the wax may be fused with resin, the balance being incorporated in the form of ordinary wax into the lacquer composition. However, in proportion to the amount of wax used in the lacquer which is not first fused, the final lacquer throws out the wax at room temperature, and in that way gives a film which is unsatisfactory in appearance and which shows lowered resistance to the transmission of moisture vapor.

Instead of allowing the resin-wax melt to cool before incorporation with the solvent as described above, the hot fused resin-wax mixture may be admixed with part or all of the solvent while the resin-wax mixture is still molten or before it has solidified. However, this alternative method produces a final lacquer with slightly lower resistance to water vapor and therefore the procedure of allowing the resin-wax melt to cool until it is solidified before dissolving in the solvent is preferred.

As the resin constituent, gum elemi is used in preference to the other resins enumerated since it is more easily fused and formulas containing it are slightly brighter than those made from other resins.

A lacquer made with gum elemi has a final melting point when applied on paper, somewhat lower than that of a lacquer made with damar. On the other hand, East India gum such as Macassar produces a lacquer which has a higher melting point than damar. Knowledge of this behavior is essential since it enables one to formulate lacquers which may be heat sealed after being applied on paper, but which will have proper resistance to heat blocking in use. By "heat sealing" is meant the closing of packages wherein the wrapper has been coated with lacquer, by the application of momentary heat and pressure along a seam or on a flap. This momentary heat and pressure unites the coatings at those points, thus enabling the package closure to be made. The temperature used may vary from around 200° F. up. By "heat blocking" is meant the coalescing or sticking together of surfaces coated with lacquer under more nearly normal temperatures. For example with a lacquer which melted at say 135° F., if the lacquered surfaces were subjected to 130–140° F. with momentary or longer pressure, the lacquer coating might unite and thus spoil the surfaces where they came in contact with each other.

In lacquers of this invention, paraffin confers greater resistance to the transmission of moisture vapor and is more economical than the other waxes enumerated and is therefore preferred, although in other respects the films produced from the various waxes are similar. A suitable paraffin wax is the 60° C. melting point paraffin sold by the Atlantic Refining Company.

The percentage of wax preliminarily fused with resin varies from 2½ to 20% by weight of total solids. Preferably it is fused with a substantially equal weight of resin and therefore the proportion of wax-resin melt will vary from 5 to 40% of the total solids. The percentage of the other principal film-forming ingredient—halogenated rubber—may vary from 20 to 60% of total solids, while the plasticizer and unfused resin or wax will make up the total of 100%, the percentage of plasticizer varying from 5 to 30%.

The percentage of solids in the final lacquer may be varied from 15% to 50%, as desired. Experience has shown that 35% solids is the most successful in coating practice and for this reason this figure is preferred, although obviously the percentage of solids may be varied as indicated above without substantially affecting the moisture vapor resistance of the lacquer.

As the plasticizer there may be used high boiling esters such as dibutyl phthalate, diethyl phthalate, diamyl phthalate, dibutyl tartrate, diamyl tartrate, triphenyl phosphate, tricresyl phosphate, tributyl phosphate and the like, or heat-treated glyceride oils which are soluble in the usual lacquer solvents such as tung oil which has been bodied without gelatinization, as, for example, "thermolyzed" tung oil sold by O'Brien Varnish Co., South Bend, Indiana, or the modified tung oil known as No. 666 "Katalised oil" and sold by Reichhold Chemicals, Inc., Detroit, Michigan. Diamyl phthalate and tung oil which has been bodied without gelatinization are the preferred plasticizers since of the plasticizers enumerated these two are the most effective in preventing crystallization or precipitation of the wax and impart to the film the greatest resistance to moisture vapor transmission. The "thermolyzed" tung oil produces a brighter film than diamyl phthalate but the color of the film is not as good as that of the film produced with diamyl phthalate and in addition the film has a slight residual odor whereas the film produced with diamyl phthalate is odorless. Therefore diamyl phthalate is preferred as the plasticizer. Instead of using a single plasticizer it is to be understood that mixtures of two or more such as for example mixtures of diamyl phthalate and "thermolyzed" tung oil may be employed if found desirable.

As a result of the technique of fusing the wax constituent with a part or all of the resin employed, the lacquer obtained has highly superior water vapor resistance and shows no or very little tendency to precipitate the wax at ordinary temperatures (say from 10 to 30° C.). The use of the cooled resin-wax melt together with the several other constituents described herein, namely the diamyl phthalate or heat treated tung oil plasticizer and the chlorinated rubber, combine to make the resulting lacquer superior to prior paper lacquers in numerous respects.

Thus, paper lacquers made in accordance with the present invention, when coated upon paper, prevent the transmission of moisture vapor to an extent that has not been possible heretofore. Lacquers of the present invention upon application to paper and drying yield a film which displays remarkable resistance to the transmission of water vapor even at temperatures as high as 105 to 115° F. and even with air of 70% relative humidity on either side thereof. They remain very clear, showing little or no tendency to become cloudy or throw out wax upon storage at ordinary temperatures and even upon cooling to temperatures of around 0° C. When cooled to −9° C. they become somewhat cloudy and the wax throws out in a very minute form. However, after the chilled material or film is allowed to warm to room temperature it regains its normal clarity and characteristics. In addition to the foregoing desirable characteristics, lacquers of the present invention are highly decorative when applied to paper or the like, very flexible and impart to the paper against wear, atmospheric influences such as moisture, light, etc.

Below are given a number of specific examples of methods of preparing lacquers falling within the present invention. These examples are not to be taken as limiting but merely as illustrating the invention which is to be limited only as defined in the appended claims.

*Example 1*

Equal parts by weight of white gum elemi and Atlantic Refining Company's 60° C. melting point paraffin wax are admixed and heated to 90 or 100° C., and stirred vigorously until all of the wax in the gum is fused. The batch is then allowed to cool to about 30° C. and is then cut back in the following solvent mixture in the proportion of 18 ounces by weight of the cooled resin-wax blend to one gallon of solvent mixture:

| | Parts by volume |
|---|---|
| Toluol | 85 |
| Solvesso #3 | 10 |
| Butyl acetate | 5 |

Solvesso #3 is a hydrogenated petroleum naphtha having a boiling point range of 365 to 419° F. and a flash point of about 135° F.

The solution of gum elemi-paraffin thus prepared is admixed with a toluol solution of unfused gum elemi, and with diamyl phthalate in the proportions given below: The toluol solution of unfused gum elemi was prepared by dissolving 6 lbs. of gum elemi in a gallon of toluol.

| | Parts by volume |
|---|---|
| Gum elemi-paraffin melt in solution | 82 |
| Unfused gum elemi in solution in toluol | 10 |
| Diamyl phthalate | 8 |

To one gallon of the resulting solution 1½ pounds of "Tornesit" brand of chlorinated rubber was added and the mixture was stirred until it dissolved.

The foregoing formula has the following analysis:

| | | Percent |
|---|---|---|
| Solids, | by weight of final lacquer | 35 |
| Gum elemi, | by weight of total solids) fused | 15 |
| Paraffin, | " " " } together | 12 |
| Unfused gum elemi, | " " " | 12 |
| Chlorinated rubber, | " " " | 41 |
| Diamyl phthalate, | " " " | 25 |
| Solvent, | by weight of final lacquer | 60 |
| Toluol, | by weight of total solvent | 85 |
| Solvesso #3, | " " " | 9 |
| Butyl acetate, | " " " | 5 |

The foregoing example represents a formula using a medium percentage of wax. Following is a formula representing about the lowest permissible limit on wax content.

*Example 2*

| | | Percent |
|---|---|---|
| Solids, | by weight of final lacquer | 35 |
| Gum elemi, | by weight of total solids) fused | 2.5 |
| Paraffin, | " " " } together | 2.5 |
| Unfused gum elemi, | " " " | 14 |
| Chlorinated rubber, | " " " | 55 |
| Diamyl phthalate, | " " " | 26 |
| Solvent, | by weight of final lacquer | 65 |
| Toluol, | by weight of total solvent | 86 |
| Solvesso #3, | " " " | 9 |
| Butyl acetate, | " " " | 5 |

The ingredients were combined in exactly the same manner as in Example 1.

Following is an example representing about the maximum permissible content of wax:

*Example 3*

| | | Percent |
|---|---|---|
| Solids, | by weight of final lacquer | 35 |
| Gum elemi, | by weight of total solids) fused | 20 |
| Paraffin, | " " " } together | 20 |
| Unfused gum elemi, | " " " | 10.5 |
| Chlorinated rubber, | " " " | 41 |
| Diamyl phthalate, | " " " | 8.5 |
| Solvent, | by weight of final lacquer | 65 |
| Toluol, | by weight of total solvent | 86 |
| Solvesso #3, | " " " | 9 |
| Butyl acetate, | " " " | 5 |

The ingredients were combined in exactly the same manner as in Example 1.

*Example 4*

The proportions and manner of combining were exactly the same as in Example 1 except that East India gum of the type known as Macassar were substituted weight for weight for gum elemi. The solids therefore had the following analysis:

| | | Percent |
|---|---|---|
| East India gum, | by weight of total solids) fused | 12 |
| Paraffin, | " " " } together | 12 |
| Unfused East India gum, | " " " | 11 |
| Chlorinated rubber, | " " " | 45 |
| Diamyl phthalate, | " " " | 20 |

*Example 5*

The same ingredients, proportions and manner of combining as in Example 1 were employed except that the hot fused resin-wax mixture was poured into the solvent mixture (toluol, Solvesso #3 and butyl acetate) with stirring until dissolved. The final lacquer had a lower resistance to moisture vapor transmission than the lacquer of Example 1.

*Example 6*

The same ingredients, proportions and manner of combining as in Example 1 were employed except that damar gum was substituted weight for weight for the gum elemi of Example 1.

*Example 7*

The same ingredients, proportions and manner of combining as in Example 1 were employed except that an equal weight of beeswax was substituted for the paraffin of that example.

*Example 8*

The same ingredients, proportions and manner of combining as in Example 1 were employed except that damar gum was substituted in equal percentages for the gum elemi, and beeswax was substituted in equal weight for the paraffin.

*Example 9*

The same ingredients, proportions and manner of combining as in Example 2 were employed except that carnauba wax in equal weight was substituted for the paraffin.

*Example 10*

The same ingredients, proportions and manner of combining as in Example 1 were employed except that the chlorinated rubber ("Tornesit") was replaced with an equal weight of a rubber condensation product of the type known as "Pliolite" sold by the Goodyear Tire & Rubber Co., Akron, Ohio, and described, for example, in U. S. Patent to Endres 2,052,391.

*Example 11*

The same ingredients, proportions and manner of combining as in Example 1 were employed except that tung oil which has been bodied without gelatinization and which is known as "thermolyzed" tung oil sold by O'Brien Varnish Company of South Bend, Indiana, and prepared in accordance with U. S. Patents Nos. 1,903,656 and Reissue No. 19,307 was substituted in equal proportion by weight for the diamyl phthalate of that example.

*Example 12*

The same ingredients, proportions and manner of combining as in Example 1 were employed except that modified tung oil which has been bodied without gelatinization and which is known as "No. 666 Katalised oil," sold by Reichhold Chemicals, Inc., was substituted in equal proportion by weight for the diamyl phthalate of that example.

While usually no coloring material will be added to the lacquer described herein, the transparent substantially colorless lacquer being used as such, under certain circumstances it may be desirable to color the lacquer by the incorporation of soluble dyestuffs. Ordinarily such dyestuffs will not interfere with the transparency of the lacquer. In some cases it may even be desirable to incorporate suitable insoluble pigments such as mineral pigments, lake pigments, pigment dyestuffs and the like into the lacquer. Such coloring matters or pigments may impart lowered lustre to the final film and depending upon their type will impart transparent, translucent or opaque colors to the lacquer.

In the claims by "tung oil which has been bodied without gelatinization" it is intended to include tung oil which has been heated very rapidly as by passing it through a heated coil, to a temperature exceeding 650° F. without gelatinization taking place so as to convert it into a non-drying oil readily soluble in the usual organic solvents in the manner disclosed in Reece Patents 1,903,656 and Reissue 19,307, or tung oil which is modified somewhat with other drying oils and which has been heat-bodied in the presence of "negative catalysts" which prevent gelatinization such as the No. 666 "Katalised oil" of Reichhold Chemicals, Inc., Detroit, Michigan, or the equivalent thereof.

Gum elemi when fresh is usually a clear pale liquid or soft solid, but on keeping it changes to a solid resin and frequently becomes quite hard. The term "fusible resin" employed in the specification and claims is intended to include gum elemi whether it is liquid, plastic, or solid.

In the claims by the term "wax" I intend to include not only true waxes but also wax-like substances commonly known as waxes such as paraffin wax, Japan wax, etc.

In the claims by the term "halogenated rubber" I intend to include chlorinated rubber, rubber hydrochloride and similar derivatives of rubber such as are described in Chapter 55 of Ellis, "The chemistry of synthetic resins."

Having described my invention, what I claim is:

1. A process of preparing a moisture vapor proof lacquer which comprises fusing together a fusible resin and a wax into a homogeneous melt, and dissolving the homogeneous resin-wax mixture and a halogenated rubber and a plasticizer in a suitable volatile organic solvent therefor.

2. A process of preparing a moisture vapor proof lacquer which comprises fusing together a fusible resin and a wax into a homogeneous melt, cooling the melt below the solidification point thereof, and dissolving the solidified melt and a halogenated rubber and a plasticizer in a suitable volatile organic solvent therefor.

3. A process of preparing a moisture vapor proof lacquer which comprises fusing together a fusible natural resin and a wax into a homogeneous melt, and dissolving the homogeneous resin-wax mixture and a halogenated rubber and a plasticizer in a suitable volatile organic solvent therefor.

4. A process as claimed in claim 3 wherein the said halogenated rubber is a chlorinated rubber.

5. A process of preparing a moisture vapor proof lacquer which comprises fusing together a fusible resin and a wax into a homogeneous melt, and dissolving the homogeneous resin-wax mixture and chlorinated rubber and a plasticizer in a suitable volatile organic solvent therefor.

6. A process of preparing a moisture vapor proof lacquer which comprises fusing together a fusible natural resin and a wax into a homogeneous melt, cooling the melt below the solidification point thereof, and dissolving the solidified melt and chlorinated rubber and a plasticizer in a suitable volatile organic solvent therefor.

7. A process for preparing a moisture vapor proof lacquer which comprises fusing together from 2½ to 20% of a fusible resin and from 2½ to 20% of a wax into a homogeneous melt, and thereafter dissolving the homogeneous resin-wax mixture with from 20 to 60% of halogenated rubber and from 5 to 30% plasticizer, in a suitable volatile organic solvent therefor, the sum of the percentages of resin, wax, halogenated rubber and plasticizer being 100.

8. A process for preparing a moisture vapor proof lacquer which comprises fusing together from 2½ to 20% of a fusible natural resin and from 2½ to 20% of a wax into a homogeneous melt; and thereafter dissolving the homogeneous resin-wax mixture with from 20 to 60% of chlorinated rubber and from 5 to 30% plasticizer, in a suitable volatile organic solvent therefor; the sum of the percentages of resin, wax, chlorinated rubber and plasticizer being 100.

9. A process for preparing a moisture vapor proof lacquer which comprises fusing together from 2½ to 20% of gum elemi and 2½ to 20% of paraffin wax into a homogeneous melt; and thereafter dissolving the homogeneous resin-wax mixture with from 20 to 60% of chlorinated rubber and from 5 to 30% plasticizer, in a suitable volatile organic solvent therefor; the sum of the percentages of gum elemi, wax, chlorinated rubber and plasticizer being 100.

10. A moisture vapor proof lacquer produced by the process of claim 1.

11. A moisture vapor proof lacquer produced by the process of claim 2.

12. A moisture vapor proof lacquer produced by the process of claim 3.

13. A moisture vapor proof lacquer produced by the process of claim 4.

14. A moisture vapor proof lacquer produced by the process of claim 5.

15. A moisture vapor proof lacquer produced by the process of claim 6.

16. A moisture vapor proof lacquer produced by the process of claim 7.

17. A moisture vapor proof lacquer produced by the process of claim 8.

18. A moisture vapor proof lacquer produced by the process of claim 9.

EDMOND H. BUCY.

CERTIFICATE OF CORRECTION.

Patent No. 2,266,159. December 16, 1941.

EDMOND H. BUCY.

It is hereby certified that error appears in the printed specification of the above numbered patent requiring correction as follows: Page 3, first column, lines 5 to 13 inclusive, in the table, for

| "Per-cent | | --Per-cent |
|---|---|---|
| 35 | | 35 |
| 15 | | 12 |
| 12 | | 12 |
| 12 | read | 11 |
| 41 | | 45 |
| 25 | | 20 |
| 60 | | 65 |
| 85 | | 86 |
| 9 | | 9 |
| 5 " | | 5 --; | and that the said Letters Patent should be read with this correction therein that the same may conform to the record of the case in the Patent Office.

Signed and sealed this 24th day of March, A. D. 1942.

Henry Van Arsdale,
Acting Commissioner of Patents.

(Seal)